United States Patent
Harz et al.

[11] Patent Number: 5,453,052
[45] Date of Patent: Sep. 26, 1995

[54] CONSTANT VELOCITY FIXED JOINT HAVING A CAGE CONTROLLED BY A PLURALITY OF TORQUE TRANSMITTING BALLS

[75] Inventors: Peter Harz, Hennef-Eulenberg; Werner Krude, Neunkirchen-Wolperath, both of Germany

[73] Assignee: GKN Automotive AG, Germany

[21] Appl. No.: 341,314

[22] Filed: Nov. 16, 1994

Related U.S. Application Data

[63] Continuation of Ser. No. 4,719, Jan. 14, 1993, abandoned.

[30] Foreign Application Priority Data

Feb. 13, 1992 [DE] Germany ............ 42 04 218.6
Aug. 27, 1992 [DE] Germany ............ 42 28 482.1

[51] Int. Cl.⁶ ................... F16D 3/10; F16D 3/16
[52] U.S. Cl. ........................... 464/145; 464/906
[58] Field of Search ................... 464/143, 145, 464/906

[56] References Cited

U.S. PATENT DOCUMENTS

| | | | |
|---|---|---|---|
| 1,916,442 | 4/1933 | Rzeppa | 464/906 X |
| 4,116,020 | 9/1978 | Aucktor et al. | 64/21 |
| 4,188,803 | 2/1980 | Otsuka et al. | 64/21 |
| 4,608,028 | 8/1986 | Welschof et al. | 464/145 |
| 4,610,643 | 9/1986 | Krude | 464/906 X |
| 4,820,240 | 4/1989 | Girguis | 464/145 |
| 4,915,672 | 4/1990 | Girguis | 464/145 |
| 4,968,287 | 11/1990 | Jacob | 464/145 |

FOREIGN PATENT DOCUMENTS

| | | |
|---|---|---|
| 2522670 | 12/1976 | Germany. |
| 3114290 | 4/1984 | Germany. |
| 3721775 | 1/1989 | Germany. |
| 3233753 | 6/1990 | Germany. |

*Primary Examiner*—John Q. Nguyen
*Attorney, Agent, or Firm*—Harness, Dickey & Pierce

[57] ABSTRACT

A constant velocity fixed joint has an inner joint part which is axially supported by a stop face located on the inside of the outer joint part. The movement of the cage is controlled via the balls and, to prevent any outward movement, the axial support of the inner joint part is limited to an annular region arranged at the open end of the hollow space of the outer joint part. The cage is arranged at a specified distance from the inner surface of the outer joint part and from the outer surface of the inner joint part.

21 Claims, 3 Drawing Sheets

CONSTANT VELOCITY FIXED JOINT HAVING A CAGE CONTROLLED BY A PLURALITY OF TORQUE TRANSMITTING BALLS

This is a continuation of U.S. patent application Ser. No. 08/004,719, filed Jan. 14, 1993, now abandoned.

FIELD OF THE INVENTION

The present invention relates to constant velocity fixed joints. More particularly, the present invention relates to a constant velocity fixed joint having an inner member supported axially in the hollow space of the outer member.

BACKGROUND AND SUMMARY OF THE INVENTION

The invention relates to a constant velocity fixed joint having a bell-shaped outer joint part comprising a hollow space and uniformly circumferentially distributed outer running grooves, and an inner joint part with inner running grooves corresponding to the outer running grooves, as well as torque transmitting balls received in the inner and outer running grooves and held in the windows of a cage arranged between the outer joint part and inner joint part, the inner joint part, with a stop face associated therewith, being supported axially inwardly in the hollow space of the outer joint part on a corresponding stop face.

The inner joint part is known to be axially inwardly supported in the hollow space of an outer joint part (DE-OS 3 114290), the object of such a solution being to provide a distance between the outer face of the inner joint part and the inner face of the cage, thereby eliminating the need of machining the inner face of the cage and the outer face of the inner joint part.

The disadvantage of the above-described solution is that the inner face of the outer joint part still has to be subjected to an expensive machining operation and that the joint has to be built with overly tight tolerances and conforming surfaces on the mating parts.

It is the object of the present invention to provide a constant velocity fixed joint in the case of which all expensive machining operations on the inner faces are eliminated, with friction and thus rises in temperature being reduced considerably. Furthermore, the requirement of overly tight tolerances and conforming surfaces of mating parts of the joint is to be avoided.

In accordance with the invention, the objective is achieved in that the cage is controlled exclusively via the balls and supported axially outwardly via an axially limited annular region positioned at the open end of the hollow space, the cage otherwise being arranged at a distance from the inner face of the outer joint part and from the outer face of the inner joint part, the advantage of this design being that only the outer face of the cage needs to be machined. Furthermore, this design avoids any kind of excessive friction due to overly tight tolerances and conforming surfaces of the joint which may occur when the respective faces carry their loads and which would otherwise lead to high friction losses and the development of heat. The risk of jamming when the joint is articulated is also avoided without fail.

In an advantageous embodiment of the invention, the annular region is formed by wedges welded to the outer joint part between the outer running grooves under inwardly directed pressure applied during the assembly of the joint.

By welding on the wedges under an inwardly directed pressure applied during the assembly of the joint, it is possible, at the same time, to set the joint in respect of defined play values.

According to a further essential feature of the invention, the annular region is formed by radially inwardly directed guiding faces arranged between the outer running grooves.

According to a further advantageous feature of the invention, the spherically designed second stop face is determined by a radius whose center is arranged at a distance from the center line, with such radius being greater than the radius provided at the axial inside of the inner joint part and being the radius of the first stop face.

In a further embodiment of the invention it is proposed that the second stop face should be formed by a cone.

In a further embodiment of the invention it is proposed that the spherically designed first stop face should be arranged so as to be integral with the inner joint part, with supporting contact being provided between the inner joint part and the second stop face.

This design constitutes a particularly compact version of the joint in accordance with the invention.

According to a further essential feature of the invention, the spherically designed first stop face is arranged in the form of a separate part-spherical head at the end of the inner joint part facing the inside of the hollow space and that there is provided a distance between the inner joint part and the second stop face.

With this embodiment there is plenty of scope for designing the inner joint part.

According to a further advantageous embodiment of the invention, the part-spherical head is centered relative to the inner joint part via centering means.

With this design, the part-spherical head is secured perfectly against any eccentric displacement.

According to a further essential feature of the invention, the second stop face is formed by an insert arranged on the axial inside of the hollow space and radially movable to a limited extent.

With this design there is no need for machining the spherically designed contact face inside the hollow space.

According to a further advantageous feature of the invention, the insert is accommodated in a recess which is arranged on the axial inside of the hollow space and whose diameter is greater than that of the insert. In particular, this design is intended for joints provided with an offset.

This embodiment is advantageous in that the Spherical contact face of the insert may be produced by deformation.

In a further embodiment of the invention, the second stop face is designed as a planar face.

DESCRIPTION OF THE DRAWINGS

Below, the invention will be explained in greater detail with reference to an embodiment illustrated in the drawings wherein.

DETAILED DESCRIPTION OF THE PREFERRED EMBODIMENT

Figure 1:
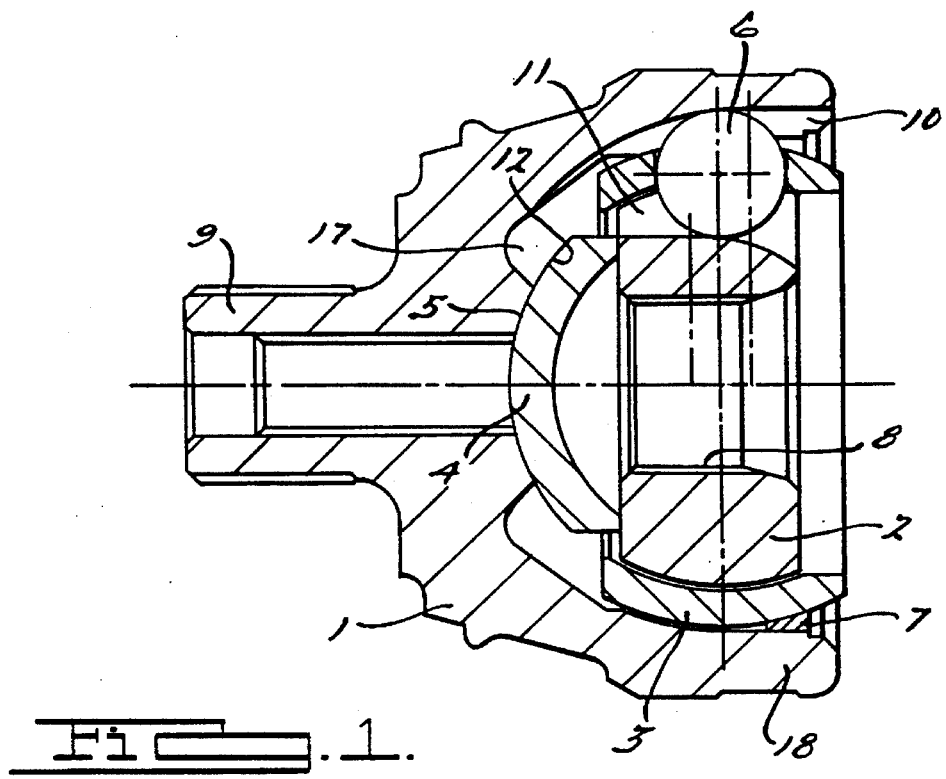
FIG. 1 shows a constant velocity fixed joint in accordance with the invention, having an inner joint part which is supported via a part-spherical head.

The constant velocity fixed joint illustrated in FIG. 1 comprises an outer joint part 1, an inner joint part 2, a cage 3 and torque transmitting balls 6. Via a part-spherical head 4 comprising a first stop face 12, the inner joint part 2 is supported on a second stop face 5 in the hollow space 17 of the outer joint part 1. It is functionally important that a distance has been provided between the inner joint part 2 and the second stop face 5.

In the case of the embodiment to FIG. 1, the cage 3, in the annular region 18, is secured by wedges 7 against being axially displaced outwardly. After the inner joint part 2 has been inserted together with the cage 3 and the balls 6, the wedges 7 constituting the annular region 18 exclusively supporting the cage are welded to the outer joint part 1 in the course of assembly while an inwardly directed pressure is applied.

This measure allows the joint to be set in respect of play.

The outer joint part 1 comprises a shank 9 for receiving a connecting shaft and the inner joint part 2 is provided with a receiving bore 8 for accommodating a connecting journal.

For torque transmitting purposes, the balls 6 are accommodated in outer running grooves 10 of the outer joint part 1 and in correspondingly arranged inner running grooves 11 of the inner joint part 2.

Figure 2:
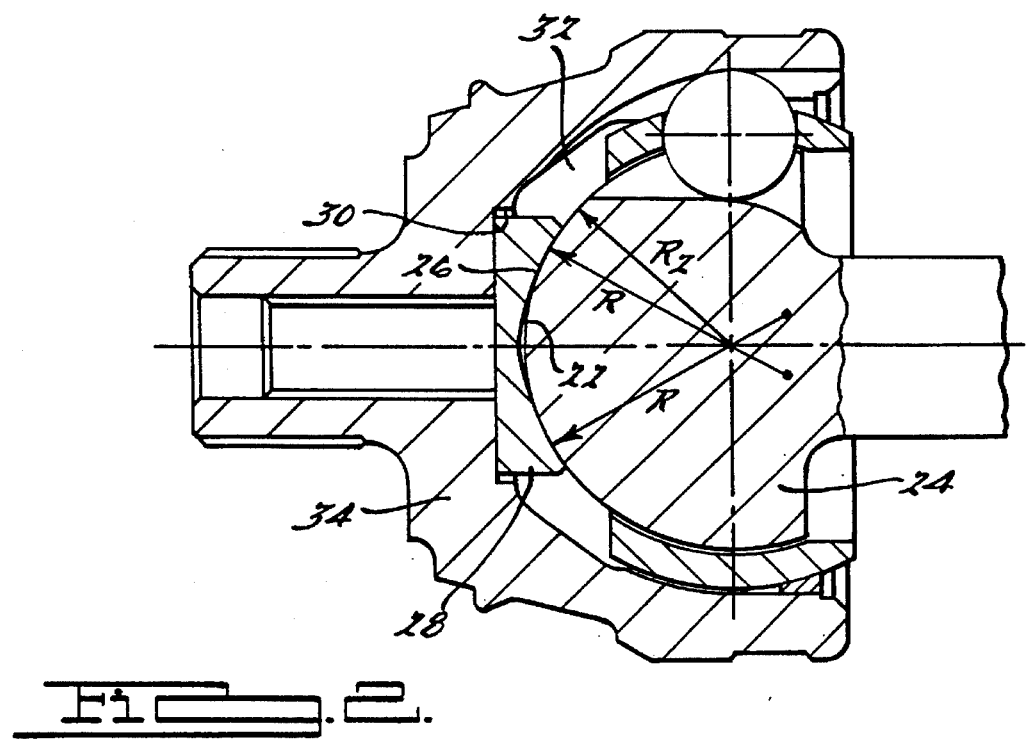
FIG. 2 shows a constant velocity fixed joint having a stop face arranged so as to be integral with the inner joint part.

FIG. 2 shows an embodiment of a constant velocity fixed joint in accordance with the invention in the case of which a spherically designed first stop face 22 is arranged so as to be integral with an inner joint part 24. In this case, a second stop face 26 is formed by an insert 28 received, with radial play, in a recess 30 in a hollow space 32 of an outer joint part 34. The radial play serves to compensate for production-related deviations and radial movements of the first stop face 22 occurring during articulation of offset joints.

FIG. 2 shows the geometric association of radii R of the second stop face and R2 of the first stop face relative to a joint centerline C.

Figure 3:
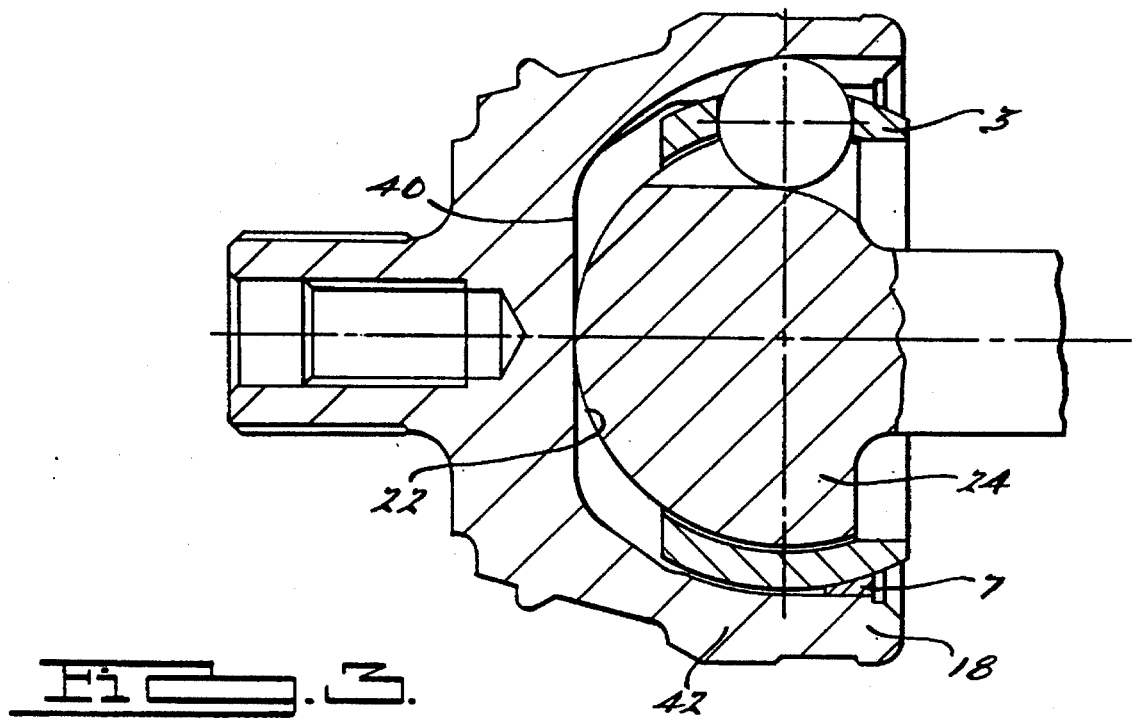
FIG. 3 shows a constant velocity fixed joint having a second stop face designed as a planar face.

FIG. 3 illustrates a constant velocity fixed joint in the case of which a second stop face 40 is designed as a planar face integral with outer joint part 42. This measure ensures that the radial movement of the first stop face is compensated for automatically. Spherically designed stop face 22 is integral with inner joint part 24 identical to that shown in FIG. 2. Cage 3, annular region 18 and wedges 7 are identical to those shown in FIG. 1.

Figure 4:
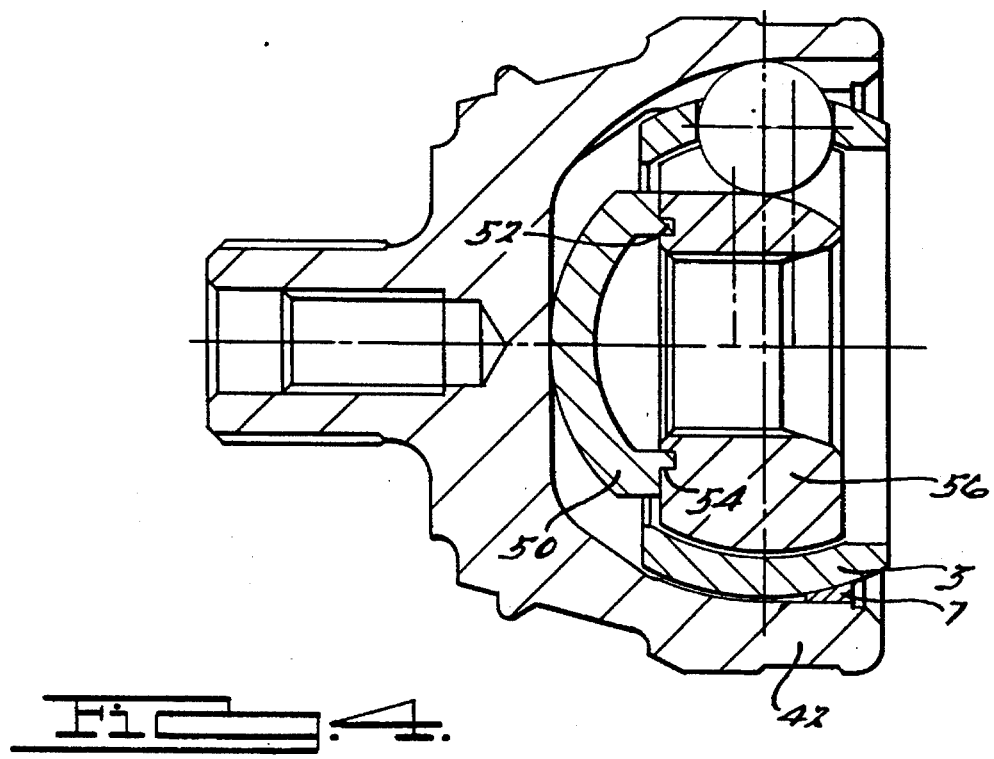
FIG. 4 shows a constant velocity fixed joint where the part-spherical head is centered at the inner joint part.

FIG. 4 shows a constant velocity fixed joint in the case of which the part-spherical head 50, via a centering ring 52, is secured against radial displacement in an annular space 54 of an inner joint part 56. Cage 3 and wedges 7 are identical to those shown in FIG. 1.

Figure 5:
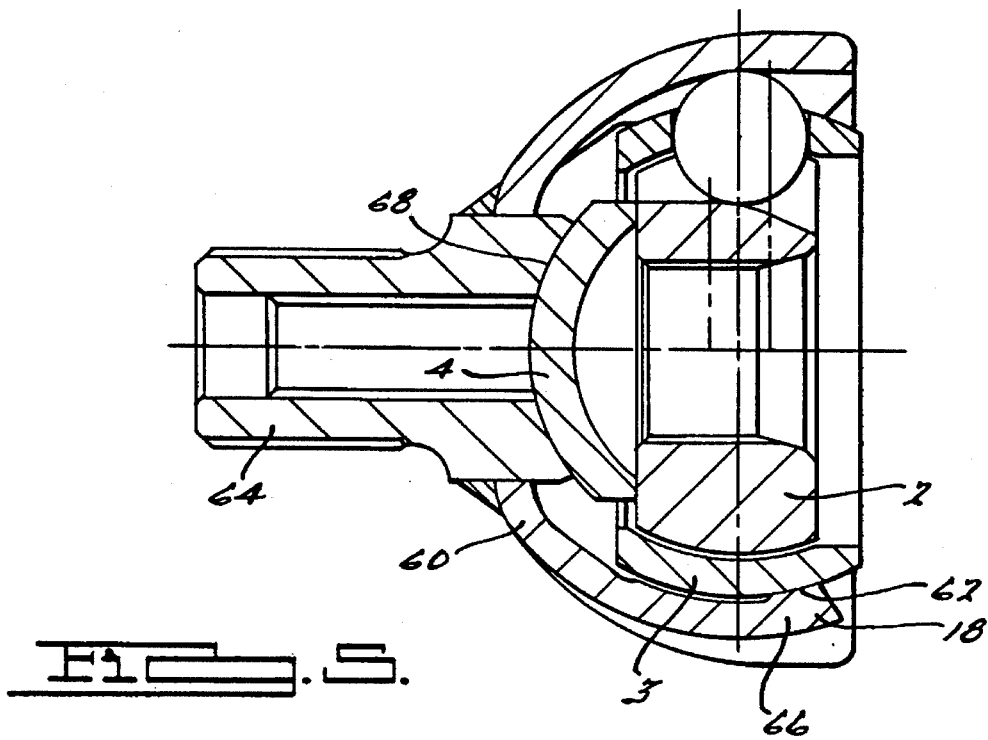
FIG. 5 illustrates a constant velocity fixed joint having an outer joint part made of plate metal and a connecting journal constituting the second stop face.

FIG. 5 shows an outer joint part 60 produced from plate metal by deep-drawing for example, in the case of which the annular part 18 is formed by radially inwardly pointing guide faces 62. The outer joint part 60 is provided with a connecting journal 64 preferably connected to an outer joint segment 66 by welding. The connecting journal 64 simultaneously constitutes a second stop face 68 for the inner joint part 2 and the part-spherical head 4 similar to that shown in FIG. 1.

Figure 6:
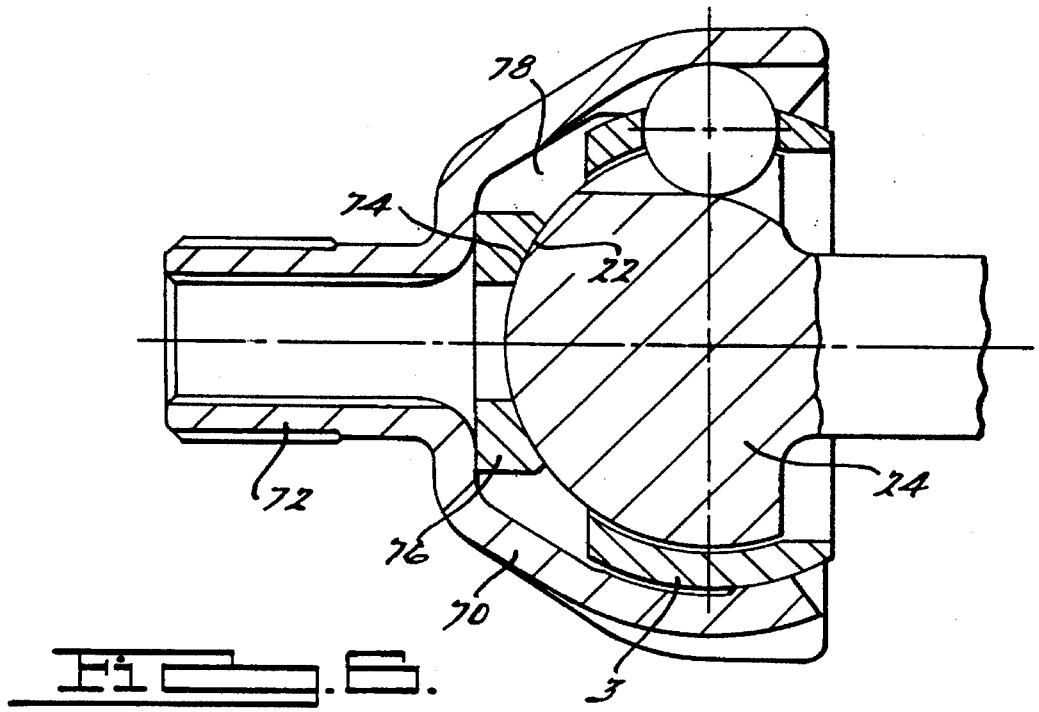
FIG. 6 shows a constant velocity fixed joint formed of plate metal, having an integrally produced connecting journal and an insert constituting the second stop face.

FIG. 6 again shows an outer joint part 70 which is formed of metal and in the case of which a connecting journal 72 was produced so as to be integral therewith. The second stop face 74 is associated with an insert 76 which is able to move radially in the hollow space 78 of the outer joint part 70. Inner joint part 24 with first stop face 22 is the same as that shown in FIG. 2.

What is claimed is:

1. A constant velocity fixed joint comprising:

a bell shaped outer joint part having a cup shaped hollow space, a second stop face and a plurality of circumferentially distributed outer running grooves, said outer joint part further having an inner surface and an axially limited annular region positioned at an open end of said hollow space;

an inner joint part having a plurality of inner running grooves corresponding to said plurality of outer running grooves and an outer surface, said inner joint part further having a first stop face associated therewith, said first stop face matingly engaging said second stop face to support said inner joint part axially inwardly within said hollow space of said outer joint part;

a cage arranged between said outer joint part and said inner joint part and having a plurality of windows corresponding to said plurality of inner and outer running grooves, said cage being disposed such that a first clearance exists between said cage and the entire inner surface of said outer joint part and a second clearance exists between said cage and the entire outer surface of said inner joint part; and a plurality of torque transmitting balls, each ball received in a respective pair of inner and outer running grooves and held in a respective window of said cage, movement of said cage being controlled by said plurality of balls, said cage being supported axially outward toward said open end of said hollow space by said axially annular region of said outer joint part.

2. The constant velocity fixed joint of claim 1 wherein said annular region is formed by a plurality of wedges fixedly secured to said outer joint part inbetween adjacent outer running grooves.

3. The constant velocity fixed joint of claim 1 wherein said annular region is formed by a plurality of inwardly directed guiding faces arranged inbetween adjacent outer running grooves.

4. The constant velocity fixed joint of claim 1 wherein said fixed joint defines a joint centerline and wherein said first stop face is partially spherical having a radius of curvature having a center generally arranged on said joint centerline, said second stop face being a partially spherical surface having a radius of curvature having a center arranged at a specified distance from said joint centerline, said radius of curvature of said second stop face being greater than the radius of curvature of said first stop face.

5. The constant velocity fixed joint of claim 1 wherein said second stop face is formed on an insert.

6. The constant velocity fixed joint of claim 1 wherein said first stop face is partially spherical and integral with said inner joint part.

7. The constant velocity fixed joint of claim 6 wherein said annular region is formed by a plurality of wedges fixedly secured to said outer joint part inbetween adjacent outer running grooves.

8. The constant velocity fixed joint of claim 6 wherein said annular region is formed by a plurality of inwardly directed guiding faces arranged inbetween adjacent outer running grooves.

9. The constant velocity fixed joint of claim 6 wherein said second stop face is formed on an insert.

10. The constant velocity fixed joint of claim 6 wherein said outer joint part includes an insert, said insert being disposed between said inner joint part and said outer joint part, said second stop face being located on said insert, said insert being radially movable with respect to said outer joint part.

11. The constant velocity joint of claim 10 wherein said insert is accommodated within a recess located in said outer joint part, said recess having a diameter greater than the diameter of said insert.

12. The constant velocity joint of claim 6 wherein said second stop face is a planar surface.

13. The constant velocity fixed joint of claim 1 wherein said constant velocity fixed joint further comprises a partially spherical head, said partially spherical head being disposed between said inner joint part and said outer joint part, said first stop face being located on said partially spherical head.

14. The constant velocity fixed joint of claim 13 further comprising means for centering said partially spherical head relative to said inner joint part.

15. The constant velocity fixed joint of claim 13 wherein said annular region is formed by a plurality of wedges fixedly secured to said outer joint part inbetween adjacent outer running grooves.

16. The constant velocity fixed joint of claim 13 wherein said annular region is formed by a plurality of inwardly directed guiding faces arranged inbetween adjacent outer running grooves.

17. The constant velocity fixed joint of claim 13 wherein said second stop face is formed on an insert.

18. The constant velocity joint of claim 13 wherein said second stop face is a planar surface.

19. The constant velocity fixed joint of claim 1 wherein said outer joint part includes an insert, said insert being disposed between said inner joint part and said outer joint part, said second stop face being located on said insert, said insert being radially movable with respect to said outer joint part.

20. The constant velocity joint of claim 19 wherein said insert is accommodated within a recess located in said outer joint part, said recess having a diameter greater than the diameter of said insert.

21. The constant velocity joint of claim 1 wherein said second stop face is a planar surface.

* * * * *